US012479475B2

(12) United States Patent
Hoare et al.

(10) Patent No.: US 12,479,475 B2
(45) Date of Patent: Nov. 25, 2025

(54) RESTARTING OPERATIONS FOR RECOVERY PROCESSES IN AUTONOMOUS SYSTEMS

(71) Applicant: GM CRUISE HOLDINGS LLC, San Francisco, CA (US)

(72) Inventors: John Hoare, San Francisco, CA (US); Drew Gross, San Francisco, CA (US); Sneha Sinha, Sunnyvale, CA (US); Florian Courbet, Berkeley, CA (US); Daniel Loman, Santa Barbara, CA (US); Andreas Pasternak, Boulder, CO (US); Kais Sorrels, San Mateo, CA (US); Serhiy Buslovskyy, Emerald Hills, CA (US); Ryan Kollar, Redondo Beach, CA (US); Jonathan Lenoff, Seattle, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 278 days.

(21) Appl. No.: 18/490,292

(22) Filed: Oct. 19, 2023

(65) Prior Publication Data

US 2025/0128736 A1 Apr. 24, 2025

(51) Int. Cl.
*B60W 50/02* (2012.01)
*B60W 60/00* (2020.01)

(52) U.S. Cl.
CPC .. *B60W 60/00186* (2020.02); *B60W 50/0205* (2013.01); *B60W 50/0225* (2013.01)

(58) Field of Classification Search
CPC ....... B60W 60/00186; B60W 50/0205; B60W 50/0225
See application file for complete search history.

(56) References Cited

U.S. PATENT DOCUMENTS

| 9,058,419 | B2 * | 6/2015 | Costin | G06F 1/24 |
| 9,195,232 | B1 * | 11/2015 | Egnor | B60W 10/20 |
| 2018/0050704 | A1 * | 2/2018 | Tascione | G07C 5/0808 |
| 2019/0001989 | A1 * | 1/2019 | Schoenfeld | G06F 11/1441 |
| 2021/0133057 | A1 * | 5/2021 | Hayes | G06F 11/2007 |

(Continued)

OTHER PUBLICATIONS

Burgio; "A software stack for next-generation automotive systems on many-core heterogeneous platforms"; Microprocessors and Microsystems 52; 2017; 299-311 (Year: 2017).*

(Continued)

*Primary Examiner* — Stephen Holwerda
(74) *Attorney, Agent, or Firm* — CANTOR COLBURN LLP

(57) ABSTRACT

Disclosed are embodiments for facilitating restarting operations for recovery processes in autonomous systems. In some aspects, an embodiment includes determining that an autonomous vehicle (AV) is experiencing a failure condition; identifying a plurality of restart operations to apply to one or more components of the AV contributing to the failure condition; prior to applying a restart operation of the plurality of restart operations, determining that safety conditions corresponding to the restart operation are satisfied; and applying the plurality of restart operations to the AV in accordance with an increasing order of disruptiveness of each of the restart operations to operations of the AV.

20 Claims, 10 Drawing Sheets

(56) References Cited

U.S. PATENT DOCUMENTS

| | | | |
|---|---|---|---|
| 2022/0048525 A1* | 2/2022 | Tsai | G06F 11/22 |
| 2023/0092493 A1* | 3/2023 | Lim | B60W 50/0225 |
| | | | 701/29.1 |

OTHER PUBLICATIONS

Haddad; "Increasing Reliability of an Autonomous Vehicle Stack in Robot Operating System 2"; Master Thesis, University of Western Australia; 2022; 1-35 (Year: 2022).*

Gómez-Huélamo; "How to build and validate a safe and reliable Autonomous Driving stack? A ROS based software modular architecture baseline"; 2022 IEEE Intelligent Vehicle Symposium (IV); Jun. 2022; 1282-1289 (Year: 2022).*

* cited by examiner

400

Detect, at a publisher node, a disconnect by a subscriber node to a shared memory segment owned by the publisher node
410

Re-enter connection code of a handshake thread that establishes a communication connection between the subscriber node and the shared memory segment
420

Track, by the publisher node, an index of the shared memory block that is disconnected by the subscriber node and available indices of the shared memory block that are available for reconnection
430

Assign an index of the available indices to the subscriber node based on a reconnect order of the subscriber node
440

Re-establish the shared memory connection with the subscriber node using the assigned index
450

Detect, at a subscriber node, a disconnection of a publisher node from a shared memory segment owned by publisher node and shared with the subscriber node, where the subscriber node detects the disconnect by utilizing a thread that listens for the disconnect
470

Responsive to the disconnect, re-enter connection code of a handshake thread that establishes a communication connection between the publisher node and the subscriber node
475

Re-negotiate connection to a new shared memory block created by the publisher node upon restart
480

Receive index assigned to the subscriber node for connection to the new shared memory block
485

Establish a connection to the shared memory block using the assigned index
490

Detect, by a process orchestrator of the AV, a failure of a node of one or more components of the AV
510

Confirm that safety conditions for a node restart are satisfied by the AV
520

Cause a shut down and restart process of the node to be executed on the AV
530

Facilitate a node communication connection restart for the node upon restart of the node
540

Detect, by a process orchestrator of the AV, a failure of a plurality of nodes of one or more components of the AV
610

Identify a subsystem of the AV, the subsystem corresponding to the plurality of nodes
620

Confirm that safety conditions for a subsystem restart are satisfied by the AV
630

Cause a shut down and restart process of the plurality of nodes of the subsystem to be executed on the AV
640

Facilitate a node communication connection restart for the each of the plurality of nodes upon restart of the plurality of nodes of the subsystem
650

Detect, by a process orchestrator of the AV, a failure corresponding to an AV stack of the AV
710

Confirm that safety conditions for a full stack restart are satisfied by the AV
720

Cause a shut down and restart process of the AV stack to be executed on the AV
730

As part of the restart process, establish node communication connections for each of a plurality of nodes of the AV stack upon restart of the AV stack
740

*FIG. 7*

RESTARTING OPERATIONS FOR RECOVERY PROCESSES IN AUTONOMOUS SYSTEMS

BACKGROUND

1. Technical Field

The disclosure generally relates to the field of processing systems and, more specifically, restarting operations for recovery processes in autonomous systems.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific embodiments illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIG. 4A illustrates an example method implementing subscriber node communication connection restarting operations for recovery processes in autonomous systems, in accordance with embodiments herein;

FIG. 4B illustrates an example method implementing publisher node communication connection restarting operations for recovery processes in autonomous system, in accordance with embodiments herein;

FIG. 5 illustrates an example method for implementing a node restart operation for recovery processes in autonomous systems, in accordance with embodiments herein;

FIG. 6 illustrates an example method for implementing a subsystem operation for recovery processes in autonomous systems, in accordance with embodiments herein;

FIG. 7 illustrates an example method for implementing full stack restart operations for recovery processes in autonomous systems, in accordance with embodiments herein;

DETAILED DESCRIPTION

Figure 1:
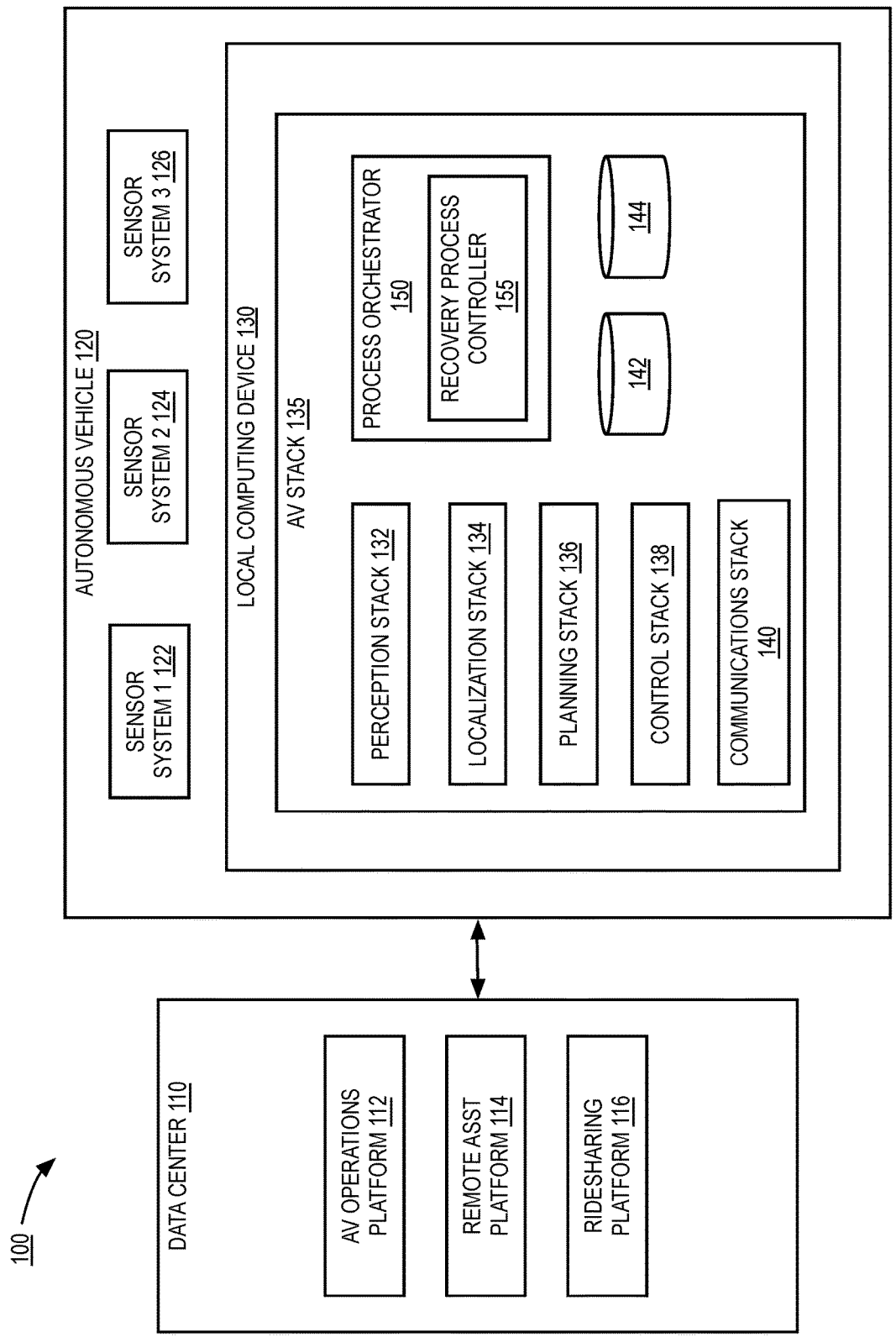
FIG. 1 is a block diagram of an example system illustrating restarting operations for recovery processes in autonomous vehicles (AVs), in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

During operation, AVs implement an AV stack 135 that can include components and processes to enable and support decision making in the AV operations in terms of routing, planning, sensing, maneuvering, operating, and so on. The AV stack 135 can include, among other stacks and systems, a perception stack 132, a localization stack 134, a planning stack 136, a control stack 138, a communications stack 140, and so on. During operation of the AVs, the loss or malfunction (e.g., failure condition) of processes running in the AV stack can cause the AV to operate in a degraded state. Operating in the degraded state can contribute negatively to the reliability posture of the AV and, in some cases (e.g., where the system cannot effectively self-recover in the field), can result in failure modes that may cause the AV to be inoperable.

In some cases, an AV can attempt to self-recover from a degraded state experienced by the AV. The degraded state may be caused by one or more failure conditions experienced by the AV. However, self-recovery of the AV in the field (e.g., operating outside of an AV facility) may be complicated by the operational and/or situational circumstances experienced by the AV at the time of the degraded state. Accordingly, in some cases, a field support representative (FSR) may be deployed to a site of the AV to troubleshoot a failure mode causing the degraded state. The FSR may consult with AV operational specialists to determine if the AV should undergo a restart in an attempt to resolve the degraded state, rather than recall the AV back to the AV facility. Deployment of FSRs and/or occurrence of inoperable AV state(s) can be time-consuming and process, and as noted above, can affect the reliability posture of AV performance. Furthermore, these events can potentially cause disruption to other drivers, disruption to emergency vehicles (e.g., ambulance, fire, police, etc.), and/or disruption to mass transit.

Embodiments herein provide for various restarting operations for recovery processes in autonomous systems. The restarting operations described herein can address the failure conditions discussed above by restarting components of the AV stack based on various conditions. Embodiments herein provide for a set of recovery processes that can be applied by the AV in order of increasing disruptiveness to the overall AV system. In embodiments herein, the set of recovery processes may include inter-process communication (IPC) restart, individual node restart, subsystem restart, and full stack restart. Embodiments herein provide for the situations (e.g., type of failure mode) that may trigger the set of recovery processes as well as the conditions (e.g., safety conditions) that should be in place for the recovery process (es) to proceed. The set of recovery processes described herein provide for a hierarchy of possible recovery operations that facilitate avoiding time-consuming failure recovery processes, such as deployment of FSRs in the field and/or occurrence of inoperable AV state(s).

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of restarting operations for recovery processes in autonomous systems of embodiments herein are further described below with respect to FIGS. 1-9.

FIG. 1 is a block diagram of an example system 100 illustrating restarting operations for recovery processes in AVs, in accordance with embodiments herein. One of ordinary skill in the art will understand that, for the system 100 and any system discussed in the disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In one embodiment, system 100 implements an AV management platform for providing restarting operations for recovery processes in autonomous systems, such as AV systems, as described further herein. The system 100 of FIG. 1 can include a data center 110 that is cloud-based or otherwise. The system 100 can further include an AV 120 or a human-operated vehicle having an advanced driver assistance system (ADAS) that can utilize various sensors including radar sensors. Although some embodiments herein are described as operating in an AV 120, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment.

In one embodiment, system 100 and its underlying components can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

In one embodiment, the data center 110 may be part of a data center for managing a fleet of AVs, such as AV 120, and AV-related services. The data center 110 can send and receive various signals to and from the AV 120. These signals can include sensor data captured by the sensor systems of the AV 120, roadside assistance requests, software updates, ridesharing pick-up and drop-off instructions, and so forth. In some examples, the data center 110 may also support a ridesharing service, a delivery service, a remote/roadside assistance service, street services (e.g., street mapping, street patrol, street cleaning, street metering, parking reservation, etc.), and the like.

In this example, the data center 110 includes one or more of an AV operations platform 112, a remote assistance platform 114, and a ridesharing platform 116, among other systems.

AV operations platform 112 can provide an infrastructure for the various backend services used to control and observe one or more fleets of AVs, including AV 120. The AV operations platform 112 may provide for vehicle services, vehicle communications (e.g., communication gateway), dispatch, fleet operations, and others.

The remote assistance platform 114 can generate and transmit instructions regarding the operation of the AV 120. For example, the remote assistance platform 114 can prepare instructions for one or more stacks or other components of the AV 120.

The ridesharing platform 116 can interact with a customer of a ridesharing service via a ridesharing application executing on a client computing device (not shown). The client computing device can be a customer's mobile computing device or a computing device integrated with the AV 120. The ridesharing platform 116 can receive requests to be picked up or dropped off from the ridesharing application and dispatch the AV 120 for the trip.

Using the platforms 112-116 hosted by data center 110, observability and control for one or more AVs, such as AV 120, can be provided by system 100. In one embodiment, AV 120 can navigate about roadways without a human driver based on sensor signals generated by multiple sensor systems 122, 124, and 126. The sensor systems 122-126 can include different types of sensors and can be arranged about the AV 120. For instance, the sensor systems 122-126 can comprise IMUS, CMMs, ISMs, wheel speed (E.G., HRWEs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 122 can be a camera system, the sensor system 124 can be a LIDAR system, and the sensor system 126 can be a RADAR system. Other embodiments may include any other number and type of sensors.

AV 120 can also include several mechanical systems (not shown) that can be used to maneuver or operate AV 120. For instance, the mechanical systems can include vehicle propulsion system, braking system, steering system, safety system, and cabin system, among other systems. The mechanical systems are described in further detail below with respect to FIG. 8.

AV 120 can additionally include a local computing device 130 that is in communication with the sensor systems 122-126, and the mechanical systems. In some embodiments, the local computing device 130 may also be in communication with data center 110 and one or more other client computing devices (not shown), among other systems. The local computing device 130 can include one or more processors and memory, including instructions that can be executed by the one or more processors. The instructions can make up one or more software stacks or components responsible for controlling the AV 120; communicating with the data center, the client computing device(s), and other systems; receiving inputs from riders, passengers, and other entities within the AV's environment; logging metrics collected by the sensor systems 122-126; and so forth.

In this example, the local computing device 130 may also include an AV stack 135. The AV stack 135 can include components and processes to enable and support decision making in the AV operations in terms of routing, planning, sensing, maneuvering, operating, and so on. The AV stack 135 can include, among other stacks and systems, a perception stack 132, a localization stack 134, a planning stack 136, a control stack 138, a communications stack 140, a High Definition (HD) geospatial database 142, and an AV operational database 144, for example. Further details of the components of AV stack 135 may be found, for example, in the discussion of FIG. 8.

As previously discussed, during operation of an AV 120, the AV stack 135 utilizes components and processes to enable and support decision making in the AV operations in terms of routing, planning, sensing, maneuvering, operating, and so on. The loss or malfunction (e.g., "failure condition") of any of these components and processes running in the AV stack 135 can cause the AV 120 to operate in a degraded state. Operating in the degraded state can contribute negatively to the reliability posture of the AV and, in some cases, can result in failure modes that may cause inoperable AV state(s).

Embodiments herein provide for various restarting operations for recovery processes in the AV 120. The restarting operations described herein can address failure conditions experienced by the AV that may lead to degraded operational states of the AV. Embodiments herein provide for restarting components of the AV stack based on various conditions. Embodiments herein provide for a set of recovery processes that can be applied by the AV in order of increasing disruptiveness to the overall AV system. In embodiments herein, the set of recovery processes may include node communication connection (e.g., inter-process communication (IPC) connection) restart, individual node restart, subsystem restart (including different levels of subsystem restart, such as starting with smaller subsystems and moving up to larger subsystems), and full stack restart.

In one embodiment, the AV stack 135 includes a process orchestrator 150 which may manage and orchestrate the initialization (i.e., "launch") of one or more nodes of the AV stack 135. A node may refer to a computation unit of the AV stack 135 that is responsible for performing a specific task within a larger system of the AV stack 135. In one embodiment, the nodes are processing nodes, such as POSIX processes or LINUX processed, for example. The robotics application may contain many nodes, which are put into subsystems (e.g., perception stack 132, localization stack 134, planning stack 136, control stack 138, communications stack 140 may each be considered a package). The nodes can communicate with each other.

Each sub-stack of the AV stack 135, including, for example, the perception stack 132, localization stack 134, planning stack 136, the control stack 138, and/or the communications stack 140, may operate as a collection of one or more nodes. In embodiments herein, the restarting operations provided by the set of recovery processes discussed herein may be applied to the nodes of the AV stack 135. In some embodiments, the process orchestrator 150 includes a recovery process controller 155 that coordinates the restarting operations for the set of recovery processes. The recovery process controller 155 may consider the situations (e.g., types of failure conditions) that may trigger the set of recovery processes, as well as enforce the conditions (e.g., safety conditions) that should be in place for the recovery process(es) to proceed. The set of recovery processes described herein provide for a hierarchy of possible recovery operations that facilitate avoiding time-consuming failure recovery processes, such as deployment of FSRs in the field and/or occurrence of inoperable AV state(s). Further details of the restarting operations for the set of recovery processes are described below with respect to FIG. 2.

Figure 2:
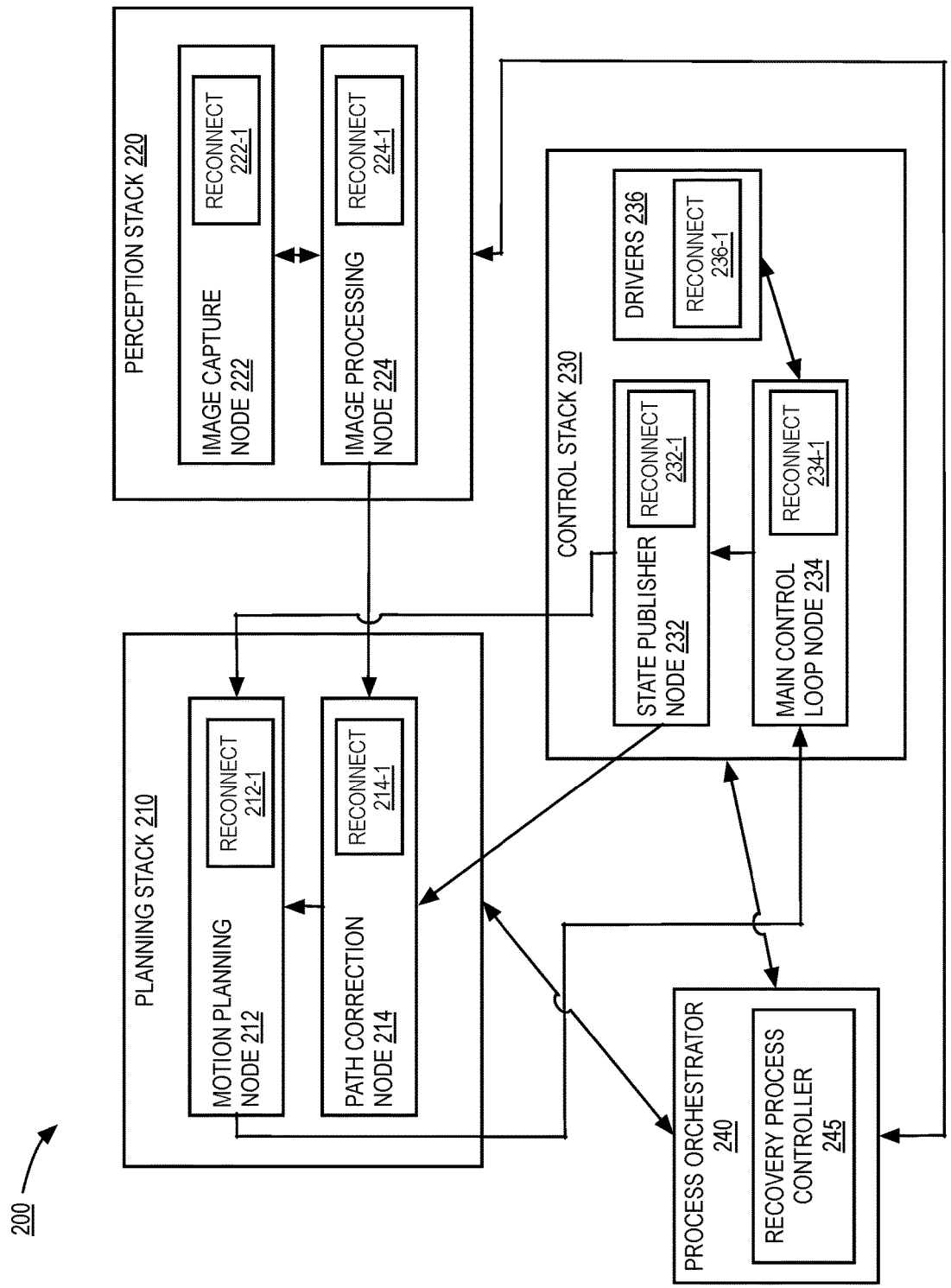
FIG. 2 is a block diagram of an example detailed view of portions of an AV stack implementing restarting operations for recovery processes in AVs, in accordance with embodiments herein.

FIG. 2 is a block diagram of an example detailed view of portions of an AV stack 200 implementing restarting operations for recovery processes in AVs, in accordance with embodiments herein. In one embodiment, AV stack 200 may be the same as AV stack 135 of FIG. 1. AV stack 200 may include a planning stack 210, a perception stack 220, a control stack 230, and a process orchestrator 240. In one embodiment, planning stack 210 may be the same as planning stack 136 of FIG. 1, perception stack 220 may be the same as perception stack 132 of FIG. 1, control stack 230 may be the same as control stack 138 of FIG. 1, and process orchestrator 240 may be the same as process orchestrator 150 of FIG. 1. More or less components than those depicted in AV stack 200 may be implemented in embodiments herein.

In some embodiments, portions of the AV stack 200 depicted in FIG. 2 may implement restarting operations for recovery processes in an AV hosting AV stack 200. The portions of AV stack 200 are provided solely for example purposes, and the techniques of embodiments herein should be understood to apply across the entire spectrum of the nodes and/or processes implemented on an AV.

In one embodiment, each of planning stack 210, perception stack 220, and control stack 230 include one or more nodes responsible for performing specific tasks of the respective stacks 210-230. For example, planning stack 210 may include a motion planning node 212 and a path correction node 214, perception stack 220 may include an image capture node 222 and an image processing node 224, and control stack 230 may include a state publisher node 232, a main control loop node 234, and one or more drivers 236. The nodes described as part of AV stack 200 are provided for example purposes and more or less nodes than described herein may be implemented in AV stack 200.

Each node 212, 214, 222, 224, 232, 234, 236 can communicate with other nodes using communication functionalities, such as inter-process communication (IPC) communication connections. IPC communication connections provide a mechanism for managing shared data between nodes. Various different communication protocols can be utilized to enable IPC, such as files, system message, sockets, message queues, shared memory, message passing, memory-mapped files, and so on. The nodes 212, 214, 222, 224, 232, 234, 236 utilize the communications via IPC in order to enable the decision making in the AV operations in terms of routing, planning, sensing, maneuvering, operating, and so on.

In embodiments herein, when the AV stack experiences a loss or malfunction (e.g., failure condition) of any of these components and processes, such as a loss or malfunction of any of the nodes 212, 214, 222, 224, 232, 234, 236 running in the AV stack 200, this can cause the AV to operate in a degraded state. In such a case, the process orchestrator 240 includes a recovery process controller 245 that can coordinate restarting operations to enable a set of recovery processes for the nodes 212, 214, 222, 224, 232, 234, 236 of AV stack 200. The recovery process controller 245 may be the same as recovery process controller 155 described with respect to FIG. 1. In one embodiment, the recovery process controller 245 may consider the situations (e.g., type of failure mode) that triggered the loss or malfunction in AV stack 200, as well as enforce any conditions (e.g., safety conditions) that should be in place for the restart operations to proceed.

As previously noted, embodiments herein provide for various restarting operations for recovery processes in the AV. In one embodiment, the recovery process controller 245 may apply restarting operations of the set of recovery processes in order of increasing intrusiveness/disruptiveness to the overall AV system. In embodiments herein, the set of recovery processes may include node communication connection (e.g., IPC connection) restart, individual node restart, subsystem restart, and full stack restart. In embodiments herein, the recovery process controller 245 may initially attempt node communication connection restart operations, followed by individual node restart, then followed by a subsystem restart, and lastly followed by a full stack restart. Each of the restart operations are described in further detail below.

As part of orchestrating the restart operations, the recovery process controller 245 may determine that a degraded state is occurring in the AV and identify a source of a failure condition causing the degraded state. The recovery process controller 245 may also enforce any conditions, such as safety conditions, that should be in place prior to any of the restart operations proceeding. Such conditions may be based on an operational state of the AV (e.g., minimal risk condition (MRC), current location, occupancy state, etc.).

With respect to the node communication connection restart, the recovery process controller 245 may communicate with a reconnect component 212-1, 214-1, 222-1, 224-1, 232-1, 234-1, 236-1 of each node 212, 214, 222, 224, 232, 234, 236 of AV stack 200 to enable a node communication connect start process to be performed for the respective node 212, 214, 222, 224, 232, 234, 236. In one embodiment, the recovery process controller 245 determines whether conditions, such as safety conditions, for the node communication connection restart process are satisfied. In one embodiment, the AV safety conditions for the node restart may include restarting a connection between multiple nodes of the software stack while the AV, including the software stack, continues to operate to allow the AV to navigate an environment. In one embodiment, continuing operating the AV in its current operational status can include, but is not limited to, the AV stack continuing to detect objects, update trajectories, generate routes, and so on.

In one embodiment, the communication connection between nodes may be established as a publisher/subscriber model, where one node is a publisher node and one or more other nodes are subscriber nodes. The publisher node owns a shared memory segment (also referred to herein as a shared memory block) that the subscriber node(s) can connect to. In embodiments herein, the communication connection protocol is deployed in a manner that allows both subscriber nodes and publisher nodes to reconnect to the shared memory segment during runtime of the AV.

With respect to subscriber node reconnections, embodiments may encompass different approaches to reconnecting the subscriber node. In one embodiment, the subscriber node may reconnect utilizing a reconnect index that is based on disconnect and reconnect order. For example, after connection and successful handshake, a handshake thread utilized by a subscriber node is not closed on the subscriber side.

In one example embodiment, on the publisher node side, each communication connection can be added to an epoll-based socket listener. Upon detecting disconnect of a subscriber node to the shared memory segment owned by the publisher node, the subscriber node can re-enter a process of the connection code. Initially, when the subscriber node connects to a shared memory segment, it is assigned an index in the shared memory block based on connection order. Subsequently, when the subscriber node disconnects and reconnects, accounting should be performed to ensure that the newly-reconnected subscriber node correctly uses an unused index. This means that the publisher node should know which index has been disconnected and further track which indices are available for reconnection (e.g., using a first-in-first-out (FIFO) queue).

In another embodiment, a different approach to reconnecting the disconnected subscriber node may include determining the reconnect index for the subscriber node by using a launch graph. The launch graph may be maintained by the process orchestrator 240, for example, and would track which subscriber nodes subscribe to which publisher node. In this embodiment, the process orchestrator 240 (e.g., using recovery process controller 245) can compute a consistent index prior to runtime. This would be passed to the node from the process orchestrator 240.

With respect to publisher node connections, embodiments may encompass different approaches to reconnecting the publisher node. In embodiments herein, there may be two main difficulties with reconnecting a publisher node: (1) ownership of the shared memory segment, and (2) the threading model for subscriber nodes detecting publisher node disconnect.

With respect to ownership of the shared memory segment, embodiments may encompass different ownership options. In one embodiment, a self-contained shared memory ownership approach may be implemented. In the self-contained shared memory ownership approach, if the publisher node owns the memory block, then upon the publisher node restarting the shared memory block should be created anew and renegotiated. This allows for maximum code reuse and is completely self-contained (e.g., no global state issues).

In another embodiment, an externally-managed approach of moving ownership of the shared memory segment away from the publisher node may be implemented. In this externally-managed approach, ownership of the shared memory segment is moved to the process orchestrator 240, for example. In another embodiment, a discovery layer can be moved out of, for example, LINUX sockets and into some other communications infrastructure. When the shared memory segment ownership is externally managed, the publisher nodes and subscriber nodes can reconnect in their constructors and the destruction is taken care of by the process orchestrator 240.

With respect to the threading model for subscriber nodes detecting publisher node disconnects, embodiments may encompass different threading model options. In one embodiment, a single thread per subscriber node approach can be implemented. In this single thread per subscriber node approach, a thread is added to each subscriber node where this thread listens for publisher node disconnects for each subscriber node. As a result, each subscriber node is self-contained and automatically handles reconnecting when a publisher node disconnects.

In another embodiment, an external thread for subscriber groups approach may be implemented. In this external thread for subscriber groups approach, an external thread is deployed that handles listening for publisher node disconnects for a group of subscriber nodes. As a result, no threads are utilized internally in the subscriber node(s).

Although the above node communication connection restart process is described in terms of a shared memory-based transport, embodiments herein may perform publisher node communication connection restarting operations via different communication channels, such as TCP/IP and other network connections, PCIe based connections, and so on.

With respect to the individual node restart, the process orchestrator 240 (e.g., using recovery process controller 245) can facilitate shut-down and restart of one or more individual nodes (e.g., nodes 212, 214, 222, 224, 232, 234, 236) of the AV stack 200. In one embodiment, the individual nodes may be identified as associated with a failure condition detected in the AV.

In some embodiments, process orchestrator 240 may maintain a list of nodes that are not eligible for restart. In this case, the process orchestrator 240 may escalate recovery processes to a next level of restart options (e.g., full stack restart) in order to address a failure condition occurring in the AV.

In some embodiments, prior to the recovery process controller 245 performing a node restart recovery process, the recovery process controller 245 determines whether conditions, such as safety conditions, for the node restart process are satisfied. In one embodiment, the AV safety conditions for the node restart may include entering into an MRC state (e.g., pulled over, fully stopped, emergency brake on, zero occupancy of AV) by the AV. In other embodiments, the AV safety conditions for the node restart may include confirming that AV operational control is successfully handed over to a secondary system to continue operating the AV.

Once the recovery process controller 245 determines that the conditions for the node restart have been achieved by the AV, the recovery process controller 245 may then attempt to shut down and restart the node. The node restart process may entail executing shutdown code if the node is not already in a shut-down state, and then causing restart code to be executed in order to re-initialize the node.

In some embodiments, a "fast" restart approach may be implemented by the recovery process controller 245. In the fast restart approach, the recovery process controller 245 may attempt to restart a node before a "watchdog" timeout occurs without interrupting the rest of the system (e.g., potentially without entering any degraded state of the AV). In this embodiment, the node is restarted as soon as it is detected that the node is failing. If the node is able to restart quickly enough, and if it restarts fast enough to avoid the watchdog timeouts then the recovery process may be successful without interrupting the AV operations. If not, the recovery process controller 245 can fall back to the regular approach of achieving the conditions, such as safety conditions, prior to node restart.

Subsequently to restarting a node, the recovery process controller 245 may further facilitate a node communication connection restart process as well. This enables the restarted node to reestablish any communication connections to other nodes in the AV stack. The node communication connection restart process to be implemented may be the same as described above and detailed below in FIGS. 4A and 4B. FIG. 5 discussed below further details the node restart process described herein.

With respect to the subsystem restart, the process orchestrator 240 (e.g., using recovery process controller 245) can facilitate shut-down and restart of a subset of nodes (e.g., one or more of nodes 212, 214, 222, 224, 232, 234, 236) of the AV stack 200. In one embodiment, the subset of nodes of a subsystem may be identified as associated with a failure condition detected in the AV. In some embodiments, a subsystem restart may be utilized when one or more nodes associated with a failure condition are stateful nodes and the most efficient approach to recovering the stateful nodes may be a restart of a subsystem of the stateful nodes in order to re-establish the state of the stateful nodes. In other embodiments, a subsystem restart may be implemented to recover a particular capability of the AV that involves multiple nodes, but does not necessarily require a full stack restart of the AV. A subsystem restart may allow for a more granular approach to recovery of the AV from a failure condition without resorting to a full AV stack restart, which can consume more time and resources than a subsystem restart of nodes of the AV stack. In some embodiments, a subsystem restart may include different levels of subsystem restart, such as starting with smaller subsystems and iteratively moving up to larger subsystems.

In one embodiment, the subsystems may be architecture subsystems of the AV stack 200, such as all nodes 212, 214 of the planning stack 210, all nodes 222, 224 of the perception stack 220, all nodes 232, 234, 236 of the control stack 230, and so on. In some embodiments, the subsystems may be capabilities subsystems that include nodes that cut across various architectural subsystems of the AV stack 200. Examples of capabilities subsystems may include, but are not limited to, all nodes that allow RA to mode the AV, all nodes enabling a logging system, and so on. In some embodiments, process orchestrator 240 may maintain a list of nodes of various subsystems of the AV stack 200.

In some embodiments, process orchestrator 240 may maintain a list of nodes of various subsystems that are not eligible for restart. In this case, the process orchestrator 240 may escalate recovery processes to a next level of restart options (e.g., full stack restart) in order to address a failure condition occurring in the AV.

In embodiments herein, similar to an individual node restart, in the subsystem restart, the recovery process controller 245 determines whether conditions, such as safety conditions, for the node restart process are satisfied prior to performing the subsystem restart process. In one embodiment, the AV safety conditions for the subsystem restart may include entering into an MRC state (e.g., pulled over, stopped, emergency brake on, zero occupancy of AV) by the AV. In other embodiments, the AV safety conditions for the subsystem restart may include confirming that AV operational control is successfully handed over (handover) to a secondary system (also referred to herein as a secondary operational system of the AV) to continue operating the AV.

Once the recovery process controller 245 determines that the conditions for the subsystem restart have been achieved by the AV, the recovery process controller 245 may then attempt to shut down and restart the subset of nodes corresponding to the subsystem of the AV. The subsystem restart process may entail executing shutdown code if the subset of nodes are not already in a shut-down state, and then causing restart code to be executed in order to re-initialize the subset of nodes.

Subsequent to restarting the subset of nodes, the recovery process controller 245 may further facilitate a node communication connection restart process for each of the nodes of the subset. This enables the restarted nodes to reestablish any communication connections to other nodes in the AV stack. The node communication connection restart process to be implemented may be the same as described above and detailed below in FIGS. 4A and 4B. FIG. 6 discussed below further details the subsystem restart process described herein.

With respect to the full stack restart, the process orchestrator 240 (e.g., using recovery process controller 245) can facilitate shut-down and restart of the AV stack 200, including all nodes (e.g., all nodes 212, 214, 222, 224, 232, 234, 236) of the AV stack 200. In one embodiment, the full stack restart is similar to a power up routine of the AV stack 200. In embodiments herein, the full stack restart is performed out in the field where the AV is operating and without the in-person presence of a user such as an FSR (e.g., is performed remotely in the field without an operations support user present).

In one embodiment, a full stack restart may be utilized as a "last-resort" recovery process when prior less-intrusive restart operations have failed to resolve a failure condition being experienced by the AV. On the other hand, in some embodiments, certain failure modes may be identified as directly escalating to a full stack restart process and may skip applying other restart processes, such as the node connection communication restart, individual node restart, and subsystem restart processes. In some embodiments, certain failure conditions may be determined to be non-full stack restart conditions and the recovery process may pass to an AV operations user, such as an FSR, to handle. For example, physical failures such as flat tires and other physical hardware failures may occur where it is known that a full stack restart does not resolve such a failure condition.

In embodiments herein, for the full stack restart, the recovery process controller 245 can first determine whether conditions, such as safety conditions, for the full stack restart process are satisfied prior to performing the full stack restart process. In one embodiment, the AV safety conditions for the subsystem restart may include entering into an MRC state (e.g., pulled over, stopped, emergency brake on (activated), zero occupancy of AV) by the AV.

Once the recovery process controller 245 determines that the conditions for the full stack restart have been achieved by the AV, the recovery process controller 245 may then attempt to shut down and restart the AV stack. The full stack restart process may entail executing shutdown code for the AV stack, and then causing restart code to be executed in order to re-initialize the AV stack. As part of restarting the AV stack, the node communication connections may be re-established between nodes. FIG. 7 discussed below further details the full stack restart process described herein.

In embodiments herein, the recovery process controller 245 may be able to map a type of failure condition to certain features and/or operations that the AV can perform. In the case of occurrence of a failure condition, the recovery process controller 245 may then identify certain restart operations to perform based on the features and operations still available to AV in that particular failure condition. In certain conditions, the recovery process controller 245 may then utilize this knowledge along with situational/contextual information of the AV (e.g., occupancy, location, enroute on a trip, etc.), to inform when and how to perform the restart operations of the recovery process. For example, the recovery process controller 245 may adapt the driving behavior (e.g., modifying route, adapting driving operations such as performing right turns only, etc.) of the AV to still get a passenger to their drop off location prior to performing restart operations (or may perform certain restart operations and delaying performing other restart operations, and so on). In some cases, the recovery process controller 245 may adapt the recovery behavior of the AV given knowledge of the context (e.g., mission) of the AV.

Figure 3:
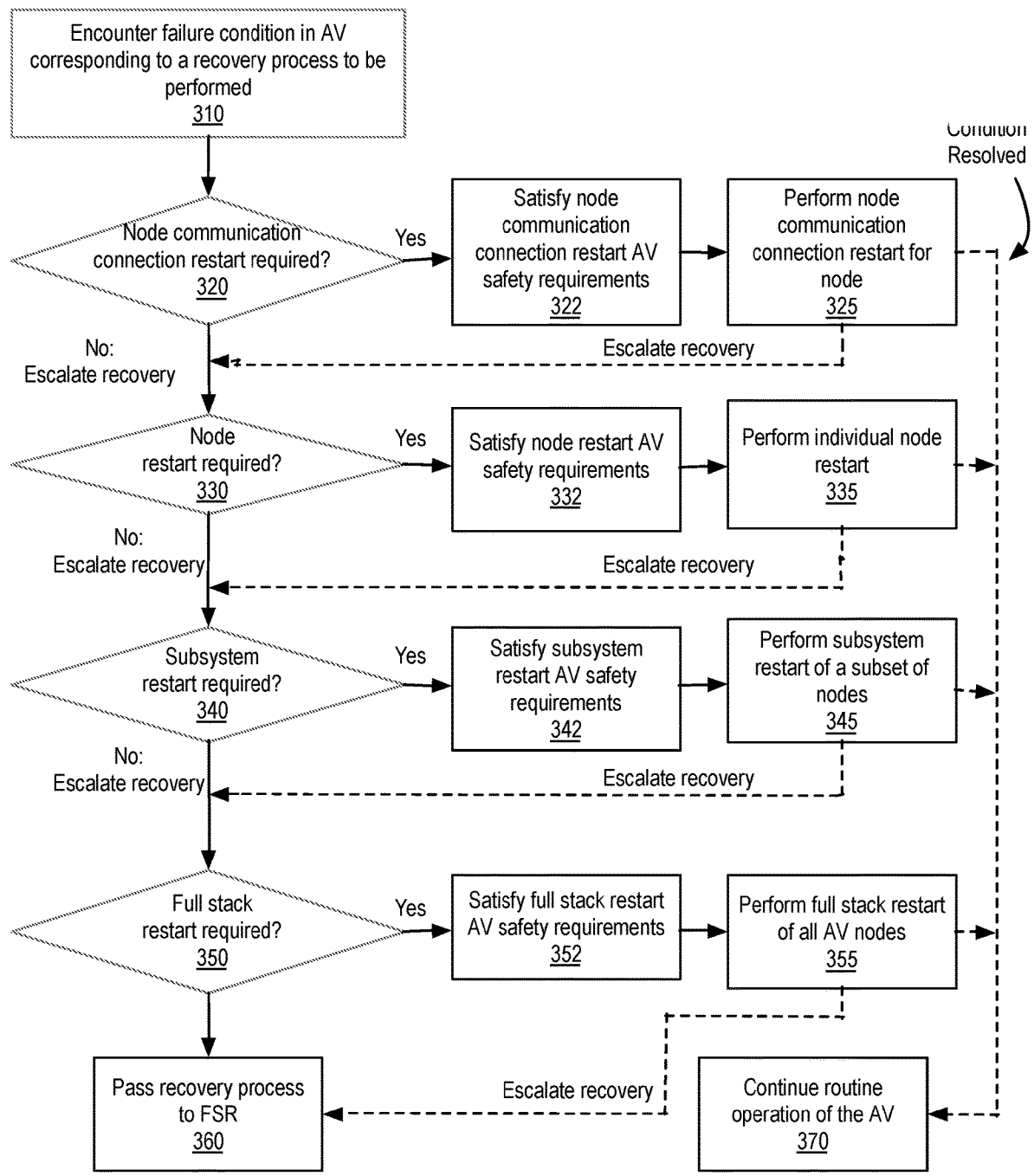
FIG. 3 illustrates an example method implementing restarting operations for recovery processes in autonomous systems, in accordance with embodiments herein.

FIG. 3 illustrates an example method 300 implementing restarting operations for recovery processes in autonomous systems, in accordance with embodiments herein. Although the example method 300 depicts a particular sequence of operations, the sequence may be altered without departing from the scope of the disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method 300 includes block 310 where a failure condition is encountered in the AV. In one embodiment, the failure condition corresponds to a recovery process to be performed by the AV. In one embodiment, the recovery process may be one or more of a node communication connection restart, a node restart, a subsystem restart, or a full stack restart.

At decision block 320, it is determined whether the node communication connection restart is required to address the failure condition. If it is determined that the node communication connection restart is not an appropriate recovery process for the particular failure condition, then method 300 may proceed on to decision block 330, discussed further below. On the other hand, if the node communication connection restart is to be performed, then method 300 proceeds to block 322 where AV safety requirements for the node communication connection restart are satisfied. In one embodiment, there may be no explicit AV safety requirements for the node communication connection restart, and the AV may continue operating in its current operational status. In one embodiment, continuing operating the AV in its current operational status can include, but is not limited to, the AV stack continuing to detect objects, update trajectories, generate routes, and so on.

At block 325, the node communication connection restart for a node of an AV stack of the AV is performed. FIGS. 4A and 4B discussed below depict a more detailed process of the node communication connection restart. Subsequent to block 325, if the failure condition is resolved (resolution of failure condition) then method 300 may proceed to block 370 where the routine operation of the AV is continued. On the other hand, if the node communication connection restart does not resolve the failure condition, then the recovery process is escalated and method 300 continues to decision block 330.

At decision block 330, it is determined whether the node restart is required to address the failure condition. If it is determined that the node restart is not an appropriate recovery process for the particular failure condition, then method 300 may proceed on to decision block 340, discussed further below. On the other hand, if the node restart is to be performed, then method 300 proceeds to block 332 where AV safety requirements for the node restart are satisfied. In one embodiment, the AV safety requirements for the node restart may include entering into an MRC state by the AV. In other embodiments, the AV safety requirement for the node restart may include confirming that AV operational control is successfully handed over to a secondary system to continue operating the AV. At block 335, the node restart for a node of the AV stack of the AV is performed. FIG. 5 discussed below depicts a more detailed process of the node restart. Subsequent to block 335, if the failure condition is resolved then method 300 may proceed to block 370 where the routine operation of the AV is continued. On the other hand, if the node restart does not resolve the failure condition, then the recovery process is escalated and method 300 continues to decision block 340.

At decision block 340, it is determined whether the subsystem restart is required to address the failure condition. If it is determined that the subsystem restart is not an appropriate recovery process for the particular failure condition, then method 300 may proceed on to decision block 350, discussed further below. On the other hand, if the subsystem restart is to be performed, then method 300 proceeds to block 342 where AV safety requirements for the subsystem restart are satisfied. In one embodiment, the AV safety requirements for the subsystem restart may include entering into an MRC state by the AV. In other embodiments, the AV safety requirement for the subsystem restart may include confirming that AV operational control is successfully handed over to a secondary system to continue operating the AV. At block 345, the subsystem restart for a subset of nodes of the AV stack of the AV is performed. FIG. 6 discussed below depicts a more detailed process of the subsystem restart. Subsequent to block 345, if the failure condition is resolved then method 300 may proceed to block 370 where the routine operation of the AV is continued. On the other hand, if the subsystem restart does not resolve the failure condition, then the recovery process is escalated and method 300 continues to decision block 350.

At decision block 350, it is determined whether the full stack restart is required to address the failure condition. If it is determined that the full stack restart is not an appropriate recovery process for the particular failure condition, then method 300 may proceed on to block 360, where the recovery process is passed to an FSR to continue trying to resolve the failure condition for the AV. On the other hand, if the full stack restart is to be performed, then method 300 proceeds to block 352 where AV safety requirements for the full stack restart are satisfied. In one embodiment, the AV safety requirements for the full stack restart may include entering into an MRC state by the AV. At block 355, the full stack restart for the AV stack of the AV is performed. FIG. 7 discussed below depicts a more detailed process of the full stack restart. Subsequent to block 355, if the failure condition is resolved then method 300 may proceed to block 370 where the routine operation of the AV is continued. On the other hand, if the full stack restart does not resolve the failure condition, then method 300 continues to block 360 where the recovery process is passed to an FSR to continue trying to resolve the failure condition for the AV.

FIG. 4A illustrates an example method 400 implementing subscriber node communication connection restarting operations for recovery processes in autonomous systems, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Although FIG. 4A is described in terms of a shared memory-based transport, embodiments herein may perform subscriber node communication connection restarting operations via different communication channels, such as TCP/IP and other network connections, PCIe based connections, and so on.

According to some embodiments, the method 400 includes block 410 where a publisher node of an AV stack detects a disconnect by a subscriber node of the AV stack. In one embodiment, the disconnect of the subscriber node is to a shared memory segment owned by the publisher node. Then, at block 420, a connection code of a handshake thread is re-entered by the subscriber node. In one embodiment, the connection code is utilized to establish a communication connection between the subscriber node and the shared memory segment.

Subsequently, at block 430, the published node may track an index of the shared memory block that is disconnected by the subscriber node and also track available indices of the shared memory block that are available for reconnection. At block 440, an index of the available indices is assigned to the subscriber node based on a reconnect order of the subscriber node. Lastly, at block 450, a shared memory connection is re-established with the subscriber node using the assigned index.

FIG. 4B illustrates an example method 460 implementing publisher node communication connection restarting operations for recovery processes in autonomous systems, in accordance with embodiments herein. Although the example method 460 depicts a particular sequence of operations, the sequence may be altered without departing from the scope of the disclosure. For example, some of the operations depicted may be performed in parallel or in a different sequence that does not materially affect the function of the method 460. In other examples, different components of an example device or system that implements the method 460 may perform functions at substantially the same time or in a specific sequence.

Although FIG. 4B is described in terms of a shared memory-based transport, embodiments herein may perform publisher node communication connection restarting operations via different communication channels, such as TCP/IP and other network connections, PCIe based connections, and so on.

According to some embodiments, the method 460 includes block 470 where a subscriber node detects a disconnection of a publisher node from a shared memory segment owned by publisher node and shared with the subscriber node. In one embodiment, the subscriber node detects the disconnect by utilizing a thread of the subscriber node that listens for the disconnect. Then, at block 475, responsive to the disconnect, the subscriber node re-enters a connection code of a handshake thread that establishes a communication connection between the publisher node and the subscriber node.

Subsequently, at block 480, a connection is re-negotiated to a new shared memory block created by the publisher node upon restart of the publisher node. At block 485, the subscriber node receives an index assigned to the subscriber node for connection to the new shared memory block. Lastly, at block 490, a connection to the shared memory block is established using the assigned index.

FIG. 5 illustrates an example method 500 for implementing a node restart operation for recovery processes in autonomous systems, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where a process orchestrator of an AV may detect a failure of a node of one or more components of the AV. Then, at block 520, it is confirmed that safety conditions for a node restart are satisfied by the AV. In one embodiment, the AV safety requirements for the node restart may include entering into an MRC state by the AV. In other embodiments, the AV safety requirement for the node restart may include confirming that AV operational control is successfully handed over to a secondary system to continue operating the AV.

Subsequently, at block 530, a shut down and restart process of the node is caused to be executed on the AV. Lastly, at block 540, a node communication connection restart is facilitated for the node upon restart of the node.

FIG. 6 illustrates an example method 600 for implementing a subsystem operation for recovery processes in autonomous systems, in accordance with embodiments herein. Although the example method 600 depicts a particular sequence of operations, the sequence may be altered without departing from the scope of the disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, the method 600 includes block 610 where a process orchestrator of the AV may detect a failure of a plurality of nodes of one or more components of the AV. Then, at block 620, a subsystem of the AV is identified, where the subsystem corresponds to the plurality of nodes. At block 630, it is confirmed that safety conditions for a subsystem restart are satisfied by the AV. In one embodiment, the AV safety requirements for the subsystem restart may include entering into an MRC state by the AV. In other embodiments, the AV safety requirement for the subsystem restart may include confirming that AV operational control is successfully handed over to a secondary system to continue operating the AV.

Subsequently, at block 640, a shutdown and restart process of the plurality of nodes of the subsystem is caused to be executed on the AV. Lastly, at block 650, a node communication connection restart for each of the plurality of nodes is facilitated upon restart of the plurality of nodes of the subsystem.

FIG. 7 illustrates an example method 700 for implementing full stack restart operations for recovery processes in autonomous systems, in accordance with embodiments herein. Although the example method 700 depicts a particular sequence of operations, the sequence may be altered without departing from the scope of the disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some embodiments, the method 700 includes block 710 where a process orchestrator of the AV may detect a failure corresponding to an AV stack of the AV. Then, at block 720, it is confirmed that safety conditions for a full stack restart are satisfied by the AV. In one embodiment, the AV safety requirements for the subsystem restart may include entering into an MRC state by the AV.

Subsequently, at block 730, a shutdown and restart process of the AV stack is caused to be executed on the AV. Lastly, at block 740, as part of the restart process, a node communication connection is established for each of a plurality of nodes of the AV stack.

Figure 8:
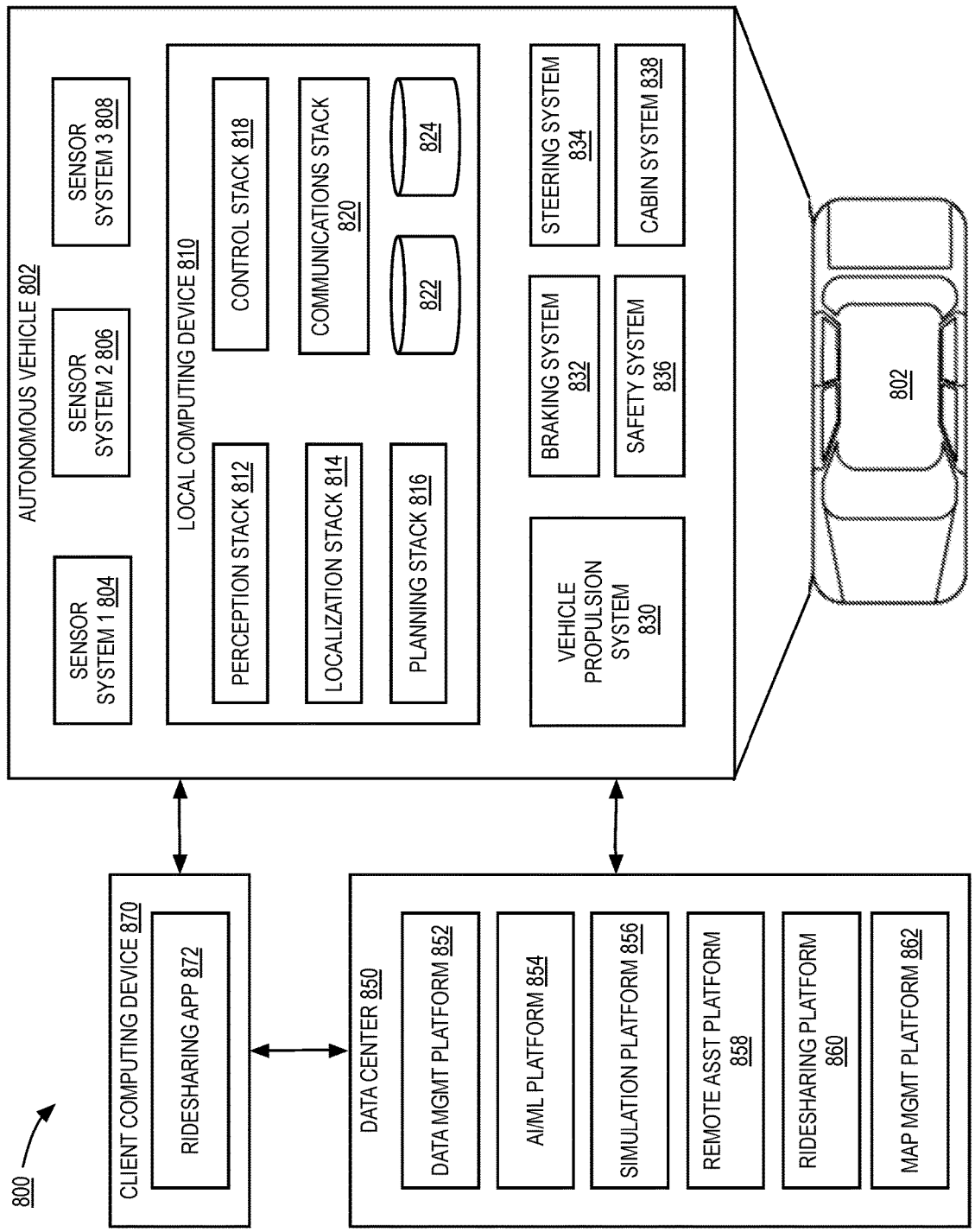
FIG. 8 illustrates an example system environment that can be used to facilitate AV dispatch and operations, according to some aspects of the disclosed technology.

Turning now to FIG. 8, this figure illustrates an example of an AV management system 800. In one embodiment, the AV management system 800 can implement a system for restarting operations for recovery processes in autonomous systems. One of ordinary skill in the art will understand that, for the AV management system 800 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, the data center 850, and the client computing device 870 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 802 can navigate about roadways without a human driver based on sensor signals generated by multiple sensor systems 804, 806, and 808. The sensor systems 804-808 can include different types of sensors and can be arranged about the AV 802. For instance, the sensor systems 804-808 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 can be a camera system, the sensor system 806 can be a LIDAR system, and the sensor system 808 can be a RADAR system. Other embodiments may include any other number and type of sensors.

AV 802 can also include several mechanical systems that can be used to maneuver or operate AV 802. For instance, the mechanical systems can include vehicle propulsion system 830, braking system 832, steering system 834, safety system 836, and cabin system 838, among other systems. Vehicle propulsion system 830 can include an electric motor, an internal combustion engine, or both. The braking system 832 can include an engine brake, a wheel braking system (e.g., a disc braking system that utilizes brake pads), hydraulics, actuators, and/or any other suitable componentry configured to assist in decelerating AV 802. The steering system 834 can include suitable componentry configured to control the direction of movement of the AV 802 during navigation. Safety system 836 can include lights and signal indicators, a parking brake, airbags, and so forth. The cabin system 838 can include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 can include one or more client interfaces (e.g., Graphical User Interfaces (GUIs), Voice User Interfaces (VUIs), etc.) for controlling certain aspects of the mechanical systems 830-838.

AV 802 can additionally include a local computing device 810 that is in communication with the sensor systems 804-808, the mechanical systems 830-838, the data center 850, and the client computing device 870, among other systems. The local computing device 810 can include one or more processors and memory, including instructions that can be executed by the one or more processors. The instructions can make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, a High Definition (HD) geospatial database 822, and an AV operational database 824, among other stacks and systems.

Perception stack 812 can enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 can detect and classify objects and determine their current and predicted locations, speeds, directions, and the like. In addition, the perception stack 812 can determine the free space around the AV 802 (e.g., to maintain a safe distance from other objects, change lanes, park the AV, etc.). The perception stack 812 can also identify environmental uncertainties, such as where to look for moving objects, flag areas that may be obscured or blocked from view, and so forth.

Mapping and localization stack 814 can determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 can compare sensor data captured in real-time by the sensor systems 804-808 to data in the HD geospatial database 822 to determine its precise (e.g., accurate to the order of a few centimeters or less) position and orientation. The AV 802 can focus its search based on sensor data from one or more first sensor systems (e.g., GPS) by matching sensor data from one or more second sensor systems (e.g., LIDAR). If the mapping and localization information from one system is unavailable, the AV 802 can use mapping and localization information from a redundant system and/or from remote data sources.

The planning stack 816 can determine how to maneuver or operate the AV 802 safely and efficiently in its environment. For example, the planning stack 816 can receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 802 from one point to another. The planning stack 816 can determine multiple sets of one or more mechanical operations that the AV 802 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 can select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 can manage the operation of the vehicle propulsion system 830, the braking system 832, the steering system 834, the safety system 836, and the cabin system 838. The control stack 818 can receive sensor signals from the sensor systems 804-808 as well as communicate with other stacks or components of the local computing device 810 or a remote system (e.g., the data center 850) to effectuate operation of the AV 802. For example, the control stack 818 can implement the final path or actions from the multiple paths or actions provided by the planning stack 816. This can involve turning the routes and decisions from the planning stack 816 into commands for the actuators that control the AV's steering, throttle, brake, and drive unit.

The communication stack 820 can transmit and receive signals between the various stacks and other components of the AV 802 and between the AV 802, the data center 850, the client computing device 870, and other remote systems. The communication stack 820 can enable the local computing device 810 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 820 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 822 can store HD maps and related data of the streets upon which the AV 802 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 824 can store raw AV data generated by the sensor systems 804-808 and other components of the AV 802 and/or data received by the AV 802 from remote systems (e.g., the data center 850, the client computing device 870, etc.). In some embodiments, the raw AV data can include HD LIDAR point cloud data, image or video data, RADAR data, GPS data, and other sensor data that the data center 850 can use for creating or updating AV geospatial data as discussed further below with respect to FIG. 8 and elsewhere in the present disclosure.

The data center 850 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 850 can include one or more computing devices remote to the local computing device 810 for managing a fleet of AVs and AV-related services. For example, in addition to managing the AV 802, the data center 850 may also support a ridesharing service, a delivery service, a remote/roadside assistance service, street services (e.g., street mapping, street patrol, street cleaning, street metering, parking reservation, etc.), and the like.

The data center 850 can send and receive various signals to and from the AV 802 and the client computing device 870. These signals can include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing platform 860, and a map management platform 862, among other systems.

Data management platform 852 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 can access data stored by the data management platform 852 to provide their respective services.

The AI/ML platform 854 can provide the infrastructure for training and evaluating machine learning algorithms for operating the AV 802, the simulation platform 856, the remote assistance platform 858, the ridesharing platform 860, the map management platform 862, and other platforms and systems. Using the AI/ML platform 854, data scientists can prepare data sets from the data management platform 852; select, design, and train machine learning models; evaluate, refine, and deploy the models; maintain, monitor, and retrain the models; and so on.

The simulation platform 856 can enable testing and validation of the algorithms, machine learning models, neural networks, and other development efforts for the AV 802, the remote assistance platform 858, the ridesharing platform 860, the map management platform 862, and other platforms and systems. The simulation platform 856 can replicate a variety of driving environments and/or reproduce real-world scenarios from data captured by the AV 802, including rendering geospatial information and road infrastructure (e.g., streets, lanes, crosswalks, traffic lights, stop signs, etc.) obtained from the map management platform 862; modeling the behavior of other vehicles, bicycles, pedestrians, and other dynamic elements; simulating inclement weather conditions, different traffic scenarios; and so on.

The remote assistance platform 858 can generate and transmit instructions regarding the operation of the AV 802. For example, in response to an output of the AI/ML platform 854 or other system of the data center 850, the remote assistance platform 858 can prepare instructions for one or more stacks or other components of the AV 802.

The ridesharing platform 860 can interact with a customer of a ridesharing service via a ridesharing application 872 executing on the client computing device 870. The client computing device 870 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 872. The client computing device 870 can be a customer's mobile computing device or a computing device integrated with the AV 802 (e.g., the local computing device 810). The ridesharing platform 860 can receive requests to be picked up or dropped off from the ridesharing application 872 and dispatch the AV 802 for the trip.

Map management platform 862 can provide a set of tools for the manipulation and management of geographic and spatial (geospatial) and related attribute data. The data management platform 852 can receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data can be processed, and map management platform 862 can render base representations (e.g., tiles (2D), bounding volumes (3D), etc.) of the AV geospatial data to enable users to view, query, label, edit, and otherwise interact with the data. Map management platform 862 can manage workflows and tasks for operating on the AV geospatial data. Map management platform 862 can control access to the AV geospatial data, including granting or limiting access to the AV geospatial data based on user-based, role-based, group-based, task-based, and other attribute-based access control mechanisms. Map management platform 862 can provide version control for the AV geospatial data, such as to track specific changes that (human or machine) map editors have made to the data and to revert changes when necessary. Map management platform 862 can administer release management of the AV geospatial data, including distributing suitable iterations of the data to different users, computing devices, AVs, and other consumers of HD maps. Map management platform 862 can provide analytics regarding the AV geospatial data and related data, such as to generate insights relating to the throughput and quality of mapping tasks.

In some embodiments, the map viewing services of map management platform 862 can be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing platform 860 may incorporate the map viewing services into the client application 872 to enable passengers to view the AV 802 in transit en route to a pick-up or drop-off location, and so on.

Figure 9:
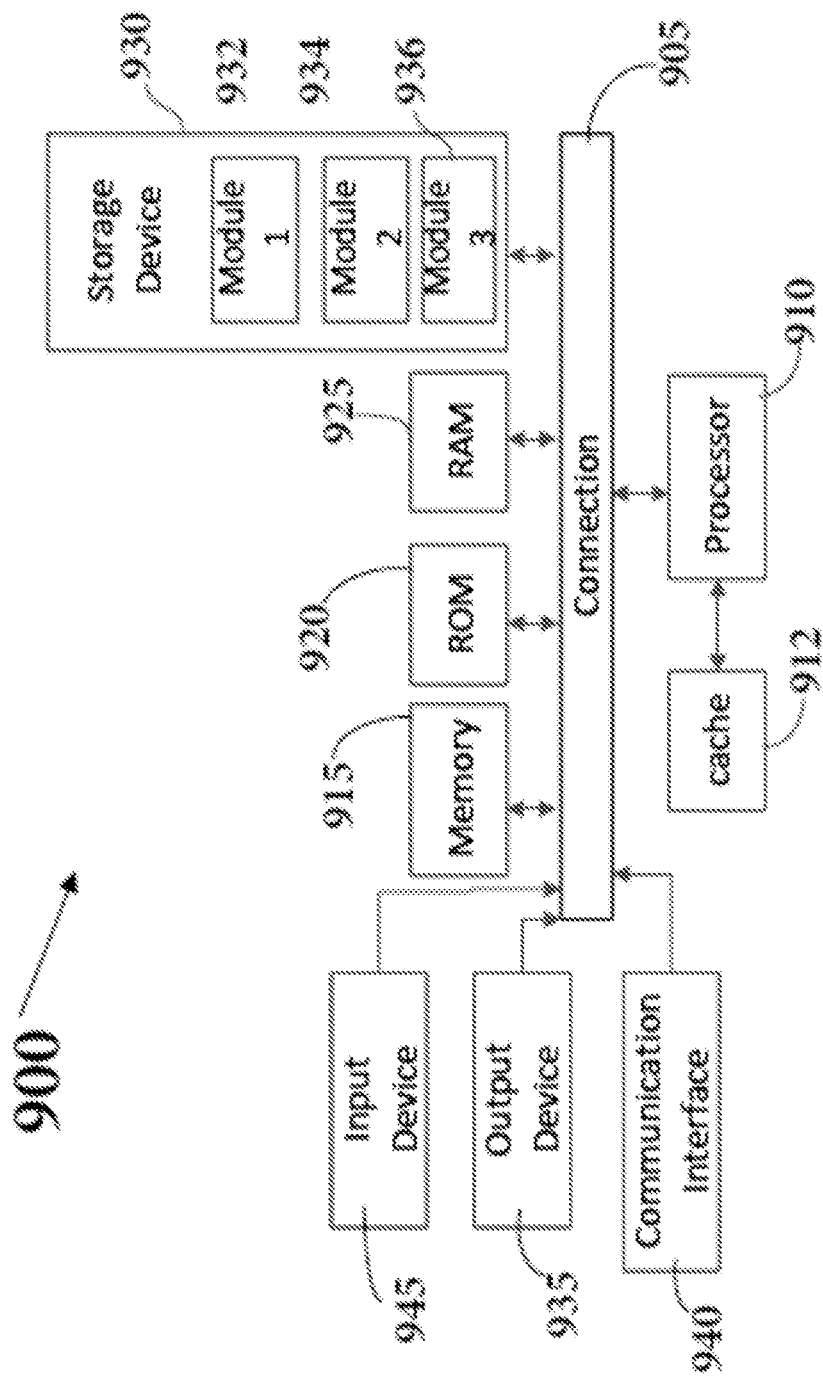
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 includes a method for facilitating restarting operations for recovery processes in autonomous systems, where the method comprises: determining, by a processing device of an autonomous vehicle (AV), that the AV is experiencing a failure condition; identifying, by the processing device, a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack; prior to applying a restart operation of the plurality of restart operations, determining that safety conditions corresponding to the restart operation are satisfied; and applying the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

In Example 2, the subject matter of Example 1 can optionally include wherein the safety conditions for the node communication connection restart comprise restarting a connection between multiple nodes of the software stack while the AV, including the software stack, continues to operate to allow the AV to navigate an environment. In Example 3, the subject matter of any one of Examples 1-2 can optionally include wherein the safety conditions for the node restart and for the subsystem restart comprise at least one of: a minimal risk condition being satisfied by the AV, wherein the minimal risk condition comprises the AV being pulled over and fully stopped with an emergency brake activated and zero occupancy of the AV; or positive confirmation of successful handover of control of the AV to a secondary operational system of the AV.

In Example 4, the subject matter of any one of Examples 1-3 can optionally include wherein the safety conditions for the full restart comprise a minimal risk condition being satisfied by the AV, wherein the minimal risk condition comprises the AV being pulled over and fully stopped with an emergency brake activated and zero occupancy of the AV. In Example 5, the subject matter of any one of Examples 1-4 can optionally include wherein the node communication connect restart comprises: detecting a disconnect of a communication connection of a node of the one or more components of the AV; and initiating a handshake protocol to establish the communication connection of the node via a shared memory segment.

In Example 6, the subject matter of any one of Examples 1-5 can optionally include wherein the node restart comprises: detecting, by a process orchestrator of the AV, a failure of a node of the one or more components of the AV; confirming that the safety conditions for the node restart are satisfied; causing a shutdown and restart process of the node to be executed on the AV; and facilitating a node communication connection restart for the node upon restart of the node.

In Example 7, the subject matter of any one of Examples 1-6 can optionally include wherein the subsystem restart comprises: detecting, by a process orchestrator of the AV, a failure of a plurality of nodes of the one or more components of the AV; identifying a subsystem of the AV, the subsystem corresponding to the plurality of nodes; confirming that the safety conditions for the subsystem restart are satisfied; causing a shutdown and restart process of the plurality of nodes of the subsystem to be executed on the AV; and facilitating a node communication connection restart for each of the plurality of nodes upon restart of the plurality of nodes of the subsystem.

In Example 8, the subject matter of any one of Examples 1-7 can optionally include wherein the full stack restart comprises: detecting, by a process orchestrator of the AV, a failure corresponding to an AV stack of the AV; confirming that the safety conditions for the full restart are satisfied; causing a shutdown and restart process of the AV stack to be executed on the AV; and facilitating a node communication connection restart for each of a plurality of nodes of the AV stack upon restart of the AV stack. In Example 9, the subject matter of any one of Examples 1-8 can optionally include wherein the node restart comprises a fast restart technique, the fast restart technique comprising restarting the at least one node without interrupting a remainder of the software stack of the AV prior to a timeout condition occurring.

Example 10 includes an apparatus for facilitating restarting operations for recovery processes in autonomous systems, the apparatus of Example 10 comprising one or more hardware processors of an autonomous vehicle (AV) to: determine that the AV is experiencing a failure condition; identify a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack; prior to applying a restart operation of the plurality of restart operations, determine that safety conditions corresponding to the restart operation are satisfied; and apply the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

In Example 11, the subject matter of Example 10 can optionally include wherein the safety conditions for the node restart and for the subsystem restart comprise at least one of: a minimal risk condition being satisfied by the AV, wherein the minimal risk condition comprises the AV being pulled over and fully stopped with an emergency brake activated and zero occupancy of the AV; or positive confirmation of successful handover of control of the AV to a secondary operational system of the AV; wherein the safety conditions for the full restart comprise the minimal risk condition being satisfied by the AV.

In Example 12, the subject matter of Examples 10-11 can optionally include wherein the node communication connect restart comprises: detecting a disconnect of a communication connection of a node of the one or more components of the AV; and initiating a handshake protocol to establish the communication connection of the node via a shared memory segment. In Example 13, the subject matter of Examples 10-12 can optionally include wherein the node restart comprises: detecting, by a process orchestrator of the AV, a failure of a node of the one or more components of the AV; confirming that the safety conditions for the node restart are satisfied; causing a shutdown and restart process of the node to be executed on the AV; and facilitating a node communication connection restart for the node upon restart of the node.

In Example 14, the subject matter of Examples 10-13 can optionally include wherein the subsystem restart comprises: detecting, by a process orchestrator of the AV, a failure of a plurality of nodes of the one or more components of the AV; identifying a subsystem of the AV, the subsystem corresponding to the plurality of nodes; confirming that the safety conditions for the subsystem restart are satisfied; causing a shutdown and restart process of the plurality of nodes of the subsystem to be executed on the AV; and facilitating a node communication connection restart for each of the plurality of nodes upon restart of the plurality of nodes of the subsystem.

In Example 15, the subject matter of Examples 10-14 can optionally include wherein the full restart comprises: detecting, by a process orchestrator of the AV, a failure corresponding to an AV stack of the AV; confirming that the safety conditions for the full stack restart are satisfied; causing a shutdown and restart process of the AV stack to be executed on the AV; and facilitating a node communication connection restart for each of a plurality of nodes of the AV stack upon restart of the AV stack.

Example 16 is a non-transitory computer-readable storage medium for facilitating restarting operations for recovery processes in autonomous systems. The non-transitory computer-readable storage medium of Example 16 having stored thereon executable computer program instructions that, when executed by one or more processors, cause the one or more processors to: determine that an autonomous vehicle (AV) comprising the one or more processors is experiencing a failure condition; identify a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack; prior to applying a restart operation of the plurality of restart operations, determine that safety conditions corresponding to the restart operation are satisfied; and apply the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

In Example 17, the subject matter of Example 16 can optionally include wherein the node communication connect restart comprises: detecting a disconnect of a communication connection of a node of the one or more components of the AV; and initiating a handshake protocol to establish the communication connection of the node via a shared memory segment. In Example 18, the subject matter of Examples 16-17 can optionally include detecting, by a process orchestrator of the AV, a failure of a node of the one or more components of the AV; confirming that the safety conditions for the node restart are satisfied; causing a shutdown and restart process of the node to be executed on the AV; and facilitating a node communication connection restart for the node upon restart of the node.

In Example 19, the subject matter of Examples 16-18 can optionally include wherein the subsystem restart comprises: detecting, by a process orchestrator of the AV, a failure of a plurality of nodes of the one or more components of the AV; identifying a subsystem of the AV, the subsystem corresponding to the plurality of nodes; confirming that the safety conditions for the subsystem restart are satisfied; causing a shutdown and restart process of the plurality of nodes of the subsystem to be executed on the AV; and facilitating a node communication connection restart for each of the plurality of nodes upon restart of the plurality of nodes of the subsystem.

In Example 20, the subject matter of Examples 16-19 can optionally include wherein the full restart comprises: detecting, by a process orchestrator of the AV, a failure corresponding to an AV stack of the AV; confirming that the safety conditions for the full stack restart are satisfied; causing a shutdown and restart process of the AV stack to be executed on the AV; and facilitating a node communication connection restart for each of a plurality of nodes of the AV stack upon restart of the AV stack.

Example 21 is a system for facilitating restarting operations for recovery processes in autonomous systems. The system of Example 21 can optionally include a memory to store a block of data, and one or more hardware processors of an autonomous vehicle (AV) to: determine that the AV is experiencing a failure condition; identify a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack; prior to applying a restart operation of the plurality of restart operations, determine that safety conditions corresponding to the restart operation are satisfied; and apply the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

In Example 22, the subject matter of Example 21 can optionally include wherein the safety conditions for the node restart and for the subsystem restart comprise at least one of: a minimal risk condition being satisfied by the AV, wherein the minimal risk condition comprises the AV being pulled over and fully stopped with an emergency brake activated and zero occupancy of the AV; or positive confirmation of successful handover of control of the AV to a secondary operational system of the AV; wherein the safety conditions for the full restart comprise the minimal risk condition being satisfied by the AV.

In Example 23, the subject matter of Examples 21-22 can optionally include wherein the node communication connect restart comprises: detecting a disconnect of a communication connection of a node of the one or more components of the AV; and initiating a handshake protocol to establish the communication connection of the node via a shared memory segment. In Example 24, the subject matter of Examples 21-23 can optionally include wherein the node restart comprises: detecting, by a process orchestrator of the AV, a failure of a node of the one or more components of the AV; confirming that the safety conditions for the node restart are satisfied; causing a shutdown and restart process of the node to be executed on the AV; and facilitating a node communication connection restart for the node upon restart of the node.

In Example 25, the subject matter of Examples 21-24 can optionally include wherein the subsystem restart comprises: detecting, by a process orchestrator of the AV, a failure of a plurality of nodes of the one or more components of the AV; identifying a subsystem of the AV, the subsystem corresponding to the plurality of nodes; confirming that the safety conditions for the subsystem restart are satisfied; causing a shutdown and restart process of the plurality of nodes of the subsystem to be executed on the AV; and facilitating a node communication connection restart for each of the plurality of nodes upon restart of the plurality of nodes of the subsystem.

In Example 26, the subject matter of Examples 21-25 can optionally include wherein the full restart comprises: detecting, by a process orchestrator of the AV, a failure corresponding to an AV stack of the AV; confirming that the safety conditions for the full stack restart are satisfied; causing a shutdown and restart process of the AV stack to be executed on the AV; and facilitating a node communication connection restart for each of a plurality of nodes of the AV stack upon restart of the AV stack.

Example 27 includes an apparatus comprising means for performing the method of any of the Examples 1-9. Example 28 is at least one machine readable medium comprising a plurality of instructions that in response to being executed on a computing device, cause the computing device to carry out a method according to any one of Examples 1-9. Example 29 is an apparatus for facilitating restarting operations for recovery processes in autonomous systems, configured to perform the method of any one of Examples 1-9. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   determining, by a processing device of an autonomous vehicle (AV), that the AV is experiencing a failure condition;
   identifying, by the processing device, a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack;
   prior to applying a restart operation of the plurality of restart operations, determining that safety conditions corresponding to the restart operation are satisfied; and
   applying the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

2. The method of claim 1, wherein the safety conditions for the node communication connection restart comprise restarting a connection between multiple nodes of the software stack while the AV, including the software stack, continues to operate to allow the AV to navigate an environment.

3. The method of claim 1, wherein the safety conditions for the node restart and for the subsystem restart comprise at least one of:
   a minimal risk condition being satisfied by the AV, wherein the minimal risk condition comprises the AV being pulled over and fully stopped with an emergency brake activated and zero occupancy of the AV; or
   positive confirmation of successful handover of control of the AV to a secondary operational system of the AV.

4. The method of claim 1, wherein the safety conditions for the full restart comprise a minimal risk condition being satisfied by the AV, wherein the minimal risk condition comprises the AV being pulled over and fully stopped with an emergency brake activated and zero occupancy of the AV.

5. The method of claim 1, wherein the node communication connect restart comprises:
   detecting a disconnect of a communication connection of a node of the one or more components of the AV; and
   initiating a handshake protocol to establish the communication connection of the node via a shared memory segment.

6. The method of claim 1, wherein the node restart comprises:
   detecting, by a process orchestrator of the AV, a failure of a node of the one or more components of the AV;
   confirming that the safety conditions for the node restart are satisfied;
   causing a shutdown and restart process of the node to be executed on the AV; and
   facilitating a node communication connection restart for the node upon restart of the node.

7. The method of claim 1, wherein the subsystem restart comprises:
   detecting, by a process orchestrator of the AV, a failure of a plurality of nodes of the one or more components of the AV;
   identifying a subsystem of the AV, the subsystem corresponding to the plurality of nodes;
   confirming that the safety conditions for the subsystem restart are satisfied;
   causing a shutdown and restart process of the plurality of nodes of the subsystem to be executed on the AV; and
   facilitating a node communication connection restart for each of the plurality of nodes upon restart of the plurality of nodes of the subsystem.

8. The method of claim 1, wherein the full stack restart comprises:
   detecting, by a process orchestrator of the AV, a failure corresponding to an AV stack of the AV;
   confirming that the safety conditions for the full restart are satisfied;
   causing a shutdown and restart process of the AV stack to be executed on the AV; and
   facilitating a node communication connection restart for each of a plurality of nodes of the AV stack upon restart of the AV stack.

9. The method of claim 1, wherein the node restart comprises a fast restart technique, the fast restart technique comprising restarting the at least one node without interrupting a remainder of the software stack of the AV prior to a timeout condition occurring.

10. An apparatus comprising:
    one or more hardware processors of an autonomous vehicle (AV) to:
    determine that the AV is experiencing a failure condition;
    identify a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack;

prior to applying a restart operation of the plurality of restart operations, determine that safety conditions corresponding to the restart operation are satisfied; and apply the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

11. The apparatus of claim 10, wherein the safety conditions for the node restart and for the subsystem restart comprise at least one of:

a minimal risk condition being satisfied by the AV, wherein the minimal risk condition comprises the AV being pulled over and fully stopped with an emergency brake activated and zero occupancy of the AV; or positive confirmation of successful handover of control of the AV to a secondary operational system of the AV;

wherein the safety conditions for the full restart comprise the minimal risk condition being satisfied by the AV.

12. The apparatus of claim 10, wherein the node communication connect restart comprises:

detecting a disconnect of a communication connection of a node of the one or more components of the AV; and initiating a handshake protocol to establish the communication connection of the node via a shared memory segment.

13. The apparatus of claim 10, wherein the node restart comprises:

detecting, by a process orchestrator of the AV, a failure of a node of the one or more components of the AV;

confirming that the safety conditions for the node restart are satisfied;

causing a shutdown and restart process of the node to be executed on the AV; and facilitating a node communication connection restart for the node upon restart of the node.

14. The apparatus of claim 10, wherein the subsystem restart comprises:

detecting, by a process orchestrator of the AV, a failure of a plurality of nodes of the one or more components of the AV;

identifying a subsystem of the AV, the subsystem corresponding to the plurality of nodes;

confirming that the safety conditions for the subsystem restart are satisfied;

causing a shutdown and restart process of the plurality of nodes of the subsystem to be executed on the AV; and facilitating a node communication connection restart for each of the plurality of nodes upon restart of the plurality of nodes of the subsystem.

15. The apparatus of claim 10, wherein the full restart comprises:

detecting, by a process orchestrator of the AV, a failure corresponding to an AV stack of the AV;

confirming that the safety conditions for the full stack restart are satisfied;

causing a shutdown and restart process of the AV stack to be executed on the AV; and facilitating a node communication connection restart for each of a plurality of nodes of the AV stack upon restart of the AV stack.

16. A non-transitory computer-readable medium having stored thereon instructions that, when executed by one or more processors, cause the one or more processors to:

determine that an autonomous vehicle (AV) comprising the one or more processors is experiencing a failure condition;

identify a plurality of restart operations to apply to one or more components of the AV contributing to the failure condition, wherein the plurality of restart operations comprise at least a node communication connection restart of at least one node communication connection of a software stack of the AV, a node restart of at least one node of the software stack, a subsystem restart of at least one subsystem of the software stack, and a full restart of the software stack;

prior to applying a restart operation of the plurality of restart operations, determine that safety conditions corresponding to the restart operation are satisfied; and apply the plurality of restart operations to the AV in accordance with an increasing order of disruptiveness of each of the plurality of restart operations to operations of the AV, wherein each of the plurality of restart operations are applied separately until occurrence of at least one of a resolution of the failure condition of the AV or completion of the plurality of restart operations.

17. The non-transitory computer-readable medium of claim 16, wherein the node communication connect restart comprises:

detecting a disconnect of a communication connection of a node of the one or more components of the AV; and initiating a handshake protocol to establish the communication connection of the node via a shared memory segment.

18. The non-transitory computer-readable medium of claim 16, wherein the node restart comprises:

detecting, by a process orchestrator of the AV, a failure of a node of the one or more components of the AV;

confirming that the safety conditions for the node restart are satisfied;

causing a shutdown and restart process of the node to be executed on the AV; and facilitating a node communication connection restart for the node upon restart of the node.

19. The non-transitory computer-readable medium of claim 16, wherein the subsystem restart comprises:

detecting, by a process orchestrator of the AV, a failure of a plurality of nodes of the one or more components of the AV;

identifying a subsystem of the AV, the subsystem corresponding to the plurality of nodes;

confirming that the safety conditions for the subsystem restart are satisfied;

causing a shutdown and restart process of the plurality of nodes of the subsystem to be executed on the AV; and facilitating a node communication connection restart for each of the plurality of nodes upon restart of the plurality of nodes of the subsystem.

20. The non-transitory computer-readable medium of claim 16, wherein the full restart comprises:

detecting, by a process orchestrator of the AV, a failure corresponding to an AV stack of the AV;

confirming that the safety conditions for the full stack restart are satisfied;

causing a shutdown and restart process of the AV stack to be executed on the AV; and facilitating a node communication connection restart for each of a plurality of nodes of the AV stack upon restart of the AV stack.

* * * * *